(12) United States Patent

Yao et al.

(10) Patent No.: US 9,193,339 B2
(45) Date of Patent: Nov. 24, 2015

(54) VEHICLE BRAKE SYSTEM AND METHOD OF CONTROL

(71) Applicant: ArvinMeritor Technology, LLC, Troy, MI (US)

(72) Inventors: Yixin Yao, Ann Arbor, MI (US); John Ashley Peterson, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 16 days.

(21) Appl. No.: 14/087,046

(22) Filed: Nov. 22, 2013

(65) Prior Publication Data

US 2015/0149056 A1    May 28, 2015

(51) Int. Cl.
*B60T 8/1761* (2006.01)
*B60T 8/58* (2006.01)
*B60W 10/196* (2012.01)
*B60W 10/188* (2012.01)
*B60T 8/32* (2006.01)
*B60T 13/58* (2006.01)

(52) U.S. Cl.
CPC ............ *B60T 8/1761* (2013.01); *B60T 8/3215* (2013.01); *B60T 8/3295* (2013.01); *B60T 8/58* (2013.01); *B60T 13/585* (2013.01); *B60W 10/188* (2013.01); *B60W 10/196* (2013.01); *B60T 2270/602* (2013.01); *B60T 2270/603* (2013.01)

(58) Field of Classification Search
CPC ... B60T 8/1761; B60T 8/3295; B60T 8/3215; B60T 8/58; B60T 13/585; B60T 2270/602; B60T 2270/603; B60W 10/196; B60W 10/188
See application file for complete search history.

(56) References Cited

U.S. PATENT DOCUMENTS

| | | | | |
|---|---|---|---|---|
| 5,130,928 | A * | 7/1992 | Petersen | 701/78 |
| 6,528,959 | B2 * | 3/2003 | Kitano et al. | 318/55 |
| 7,363,122 | B2 * | 4/2008 | Bischoff | 701/22 |
| 8,055,422 | B2 | 11/2011 | Yurgil | |
| 8,442,737 | B2 * | 5/2013 | Seurer et al. | 701/74 |
| 8,465,107 | B2 | 6/2013 | Lloyd | |
| 2007/0075659 | A1 | 4/2007 | Uenodai et al. | |
| 2008/0228368 | A1 | 9/2008 | Fuhrer et al. | |
| 2009/0145673 | A1 | 6/2009 | Soliman et al. | |
| 2011/0130937 | A1 | 6/2011 | Krueger et al. | |
| 2011/0276245 | A1 | 11/2011 | Krueger et al. | |
| 2011/0282558 | A1 | 11/2011 | Park | |
| 2012/0323460 | A1 * | 12/2012 | Okubo | 701/74 |
| 2014/0358395 | A1 * | 12/2014 | Harrison | 701/78 |

FOREIGN PATENT DOCUMENTS

WO     2013077376 A1    5/2013

OTHER PUBLICATIONS

European Patent Office, Extended Search Report for the European Patent Application No. 14188010.4 mailed Mar. 24, 2015.

* cited by examiner

*Primary Examiner* — James Trammell
*Assistant Examiner* — James E Stroud
(74) *Attorney, Agent, or Firm* — Brooks Kushman P.C.

(57) ABSTRACT

A vehicle brake system and a method of control. The vehicle brake system may include a friction brake and a secondary brake that may be applied to slow rotation of a vehicle wheel when a wheel slip condition is detected.

20 Claims, 2 Drawing Sheets

VEHICLE BRAKE SYSTEM AND METHOD OF CONTROL

TECHNICAL FIELD

This patent application relates to a vehicle brake system and a method of control.

BACKGROUND

An anti-lock and/or anti-slip brake system for commercial-type vehicles is disclosed in U.S. Pat. No. 5,130,928.

SUMMARY

In at least one embodiment, a method of controlling a vehicle brake system is provided. The method may include applying a friction brake to slow rotation of a vehicle wheel and pulsing a secondary brake when a wheel slip condition is detected.

In at least one embodiment, a method of controlling a vehicle brake system is provided. The method may include applying a friction brake torque with a friction brake to slow rotation of a vehicle wheel and determining whether a wheel slip condition is present. A secondary brake torque may be applied with a secondary brake in proportion to a wheel slip error when a wheel slip condition is present.

In at least one embodiment, a vehicle brake system is provided. The vehicle brake system may include a friction brake, a secondary brake, and a controller. The friction brake may be disposed proximate a vehicle wheel and may be configured to provide a friction brake torque to slow rotation of the vehicle wheel. The secondary brake may be configured to provide a secondary brake torque that slows rotation of the vehicle wheel by decreasing torque that is provided to the vehicle wheel to rotate the vehicle wheel. The controller may control the friction brake and the secondary brake such that the friction brake torque and the secondary brake torque are applied when a wheel slip condition is detected.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
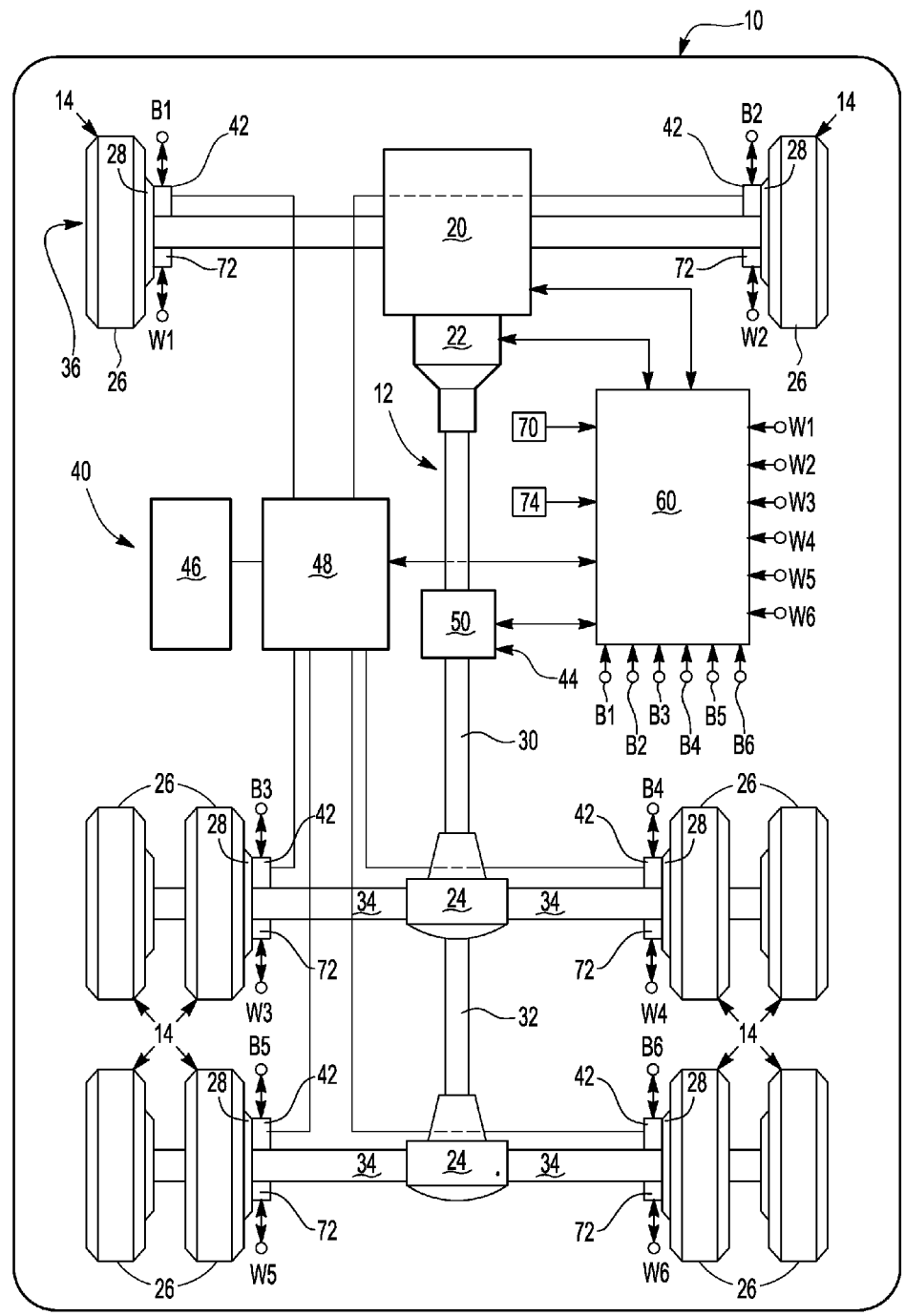
FIG. 1 is a schematic of an exemplary vehicle having a brake system.

Referring to FIG. 1, an exemplary vehicle 10 is shown. The vehicle 10 may be a motor vehicle like a truck, farm equipment, or military transport or weaponry vehicle. The vehicle 10 may include a trailer for transporting cargo in one or more embodiments.

The vehicle 10 may have a drivetrain 12 that may provide torque to one or more wheel assemblies 14 to propel the vehicle 10. The drivetrain 12 may have a hybrid configuration that may employ multiple power sources or a non-hybrid configuration. In a non-hybrid configuration, the drivetrain 12 may include an engine 20, a transmission 22, and at least one drive axle assembly 24.

The engine 20 may provide power or a propulsion torque that may be used to rotate one or more wheel assemblies 14 to propel the vehicle 10. For example, the vehicle 10 may have a set of wheel assemblies 14 that may include a tire 26 mounted on a wheel 28. In at least one embodiment, the engine 20 may be configured as an internal combustion engine that may be adapted to combust any suitable type of fuel, such as gasoline, diesel fuel, or hydrogen.

The transmission 22 may be coupled to or may be driven by the engine 20. The transmission 22 may be of any suitable type, such as a multi-gear "step ratio" transmission as is known by those skilled in the art. As used herein, the term transmission may also encompass or include a transfer case that may provide multi-wheel drive or all-wheel drive capability. For simplicity, a separate transfer case is not shown in FIG. 1.

A drive axle assembly 24 may rotatably support one or more wheel assemblies 14. In FIG. 1, two drive axle assemblies 24 are shown in a tandem axle configuration, although it is contemplated that a greater or lesser number of drive axle assemblies 24 may be provided. In a tandem configuration, the drive axle assemblies 24 may be designated as a forward-rear drive axle assembly and a rear-rear drive axle assembly. An output of the transmission 22 may be connected to an input of the forward-rear axle assembly 24 with a drive shaft 30. An output of the forward-rear drive axle assembly 24 may be selectively coupled to an input of the rear-rear drive axle assembly 24, if provided, via a prop shaft 32. Each drive axle assembly 24 may each have at least one output that may be coupled to a wheel assembly 14. For example, each drive axle assembly 24 may be coupled to a corresponding wheel axle 34 or half-shaft upon which one or more wheel assemblies 14 may be disposed.

The vehicle 10 may also include a front axle assembly 36 that may be configured to steer the vehicle 10. The front axle assembly 36 may or may not be configured as a drive axle that provides torque to at least one associated wheel assembly 14.

Figure 2:
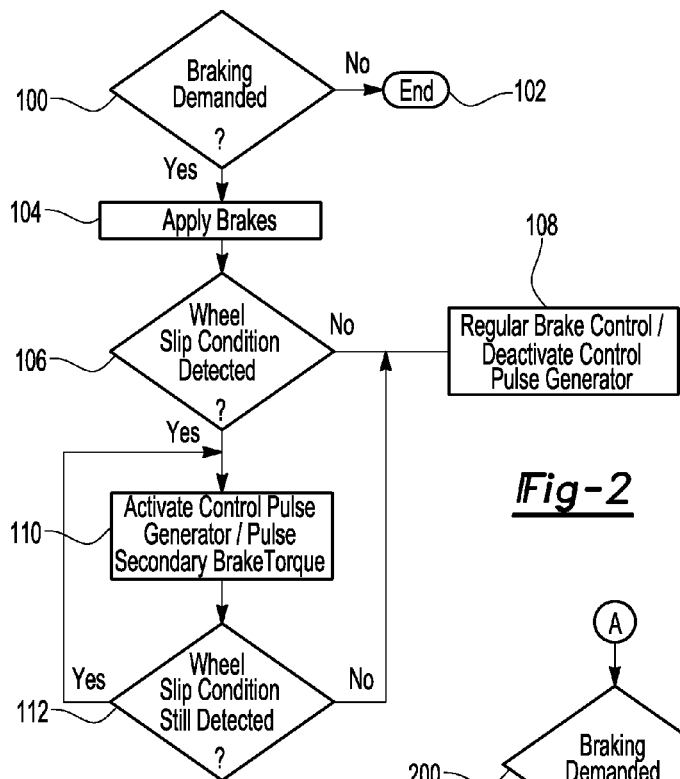
FIG. 2 is a flowchart of a method of controlling a brake system.

Referring to FIGS. 1 and 2, a brake system 40 may be provided with the vehicle 10. The brake system 40 may include a set of friction brakes 42 and at least one secondary brake 44.

A friction brake 42, which may also be called a foundation brake, may be configured to slow or inhibit rotation of at least one associated wheel assembly 14. Each friction brake 42 may be disposed proximate a wheel assembly 14 and may include at least one brake pad assembly and a brake friction member. A brake pad assembly may have a friction material, which may also be called a brake lining, that may engage the brake friction member during vehicle braking and may be spaced apart from the brake friction member when the friction brake 42 is not being applied. More specifically, a brake pad assembly may engage the brake friction member when braking is requested such that the frictional force exerted by the brake pad assembly against the brake friction member retards or slows rotation of its associated wheel assembly 14. The brake pad assembly may be spaced apart from the brake friction member when braking is not requested. As such, the brake friction member may rotate with a wheel assembly 14 and with respect to a brake pad assembly when braking is not requested.

The friction brake 42 may have any suitable configuration. For example, each friction brake 42 may be configured as a drum brake or a disc brake. In a disc brake configuration, the brake friction member may be configured as a rotor and first and second brake pad assemblies may be configured to engage opposite sides of the rotor to slow the rotation of a wheel assembly 14. In a drum brake configuration, the brake friction member may be a brake drum that extends completely around first and second brake pad assemblies that may be configured to engage the brake drum to slow rotation of a wheel assembly 14. The brake drum may be disposed between a wheel assembly 14 and a wheel hub assembly that rotatably supports the wheel assembly 14.

The friction brake 42 may use any suitable actuator or actuation system to actuate a brake pad assembly. For example, a pneumatic, hydraulic, electrical, or electromechanical actuation system may be employed as are known by those skilled in the art. In FIG. 1, the friction brake 42 has a pneumatic configuration that may include a pressurized gas source 46 and a brake blending control unit 48.

The pressurized gas source 46 may be configured to supply and/or store a volume of a pressurized gas or pressurized gas mixture, such as air and/or nitrogen. For example, the pressurized gas source 46 may include a tank and/or a pump like a compressor that may be driven by the engine 20 or vehicle power source. The pressurized gas source 46 may be disposed on the vehicle 10 and may be configured to provide a pressurized gas or pressurized gas mixture at a pressure that is greater than or equal to a target tire pressure or a target inflation pressure of a tire 26. Each tire 26 may or may not have the same target tire pressure.

The brake blending control unit 48 may be fluidly connected to the pressurized gas source 46. The brake blending control unit 48 may control operation of the friction brakes that 42 by controlling actuation of a brake pad assembly or engagement and disengagement of a brake pad assembly with the brake friction member. For example, the brake blending control unit 48 may include one or more valves that may control the flow of pressurized gas from the pressurized gas source 46 to and/or from the friction brakes 42 to advance and retract the associated brake pad assemblies.

The secondary brake 44, which may also be called an auxiliary braking device, may be separate from the friction brake 42. The secondary brake 44 may be associated with the drivetrain 12 and may provide a secondary brake torque that may slow the rotation of a wheel assembly 14 by decreasing the propulsion torque or torque that is provided to rotate the wheel assembly 14 and propel the vehicle 10. The secondary brake 44 may be provided in various configurations. For example, the secondary brake 44 may be configured as a driveline retarder 50 that may be provided with a drivetrain component, such as the transmission 22, the drive shaft 30, or a wheel axle 34. The driveline retarder 50 may utilize electromagnetic induction or magnetic force to inhibit rotation of driveline components with respect to another. For instance, the driveline retarder 50 may allow different shaft segments of the drive shaft 30 to rotate at different speeds. In addition, the secondary brake 44 may be configured as an exhaust brake, an engine compression brake, or a regenerative braking system in one or more embodiments. An exhaust brake may inhibit exhaust gas from exiting the engine 20 to reduce the engine speed and the amount of propulsion torque provided by the engine 20. An engine compression brake may open cylinder exhaust valves of the engine 20 to reduce torque output. A regenerative braking system may capture vehicle kinetic energy during braking to slow the vehicle 10.

One or more control modules or controllers 60 may be provided to monitor and control various components and systems of the vehicle 10. For example, the controller 60 may be electrically connected to or communicate with components of the drivetrain 12, such as the engine 20 and transmission 22, to monitor and control their operation and performance. The controller 60 may also monitor and control the brake system 40. For example, the controller 60 may monitor and control the amount of brake torque provided by each friction brake 42 and the secondary brake 44 and may control operation of the brake blending control unit 48 as will be discussed in more detail below. Communication between the controller 60 and each friction brake 42 or sensors associated with a friction brake 42 is represented by connection nodes B1 through B6 in FIG. 1. In addition, the controller 60 may also process input signals or data from various input devices or sensors. Input devices that may be provided with the vehicle 10 may include a brake pedal sensor 70, a wheel speed sensor 72, and a vehicle speed sensor 74.

A brake pedal sensor 70 may be provided to detect a braking command or brake input command that may be provided by a vehicle driver or vehicle operator. For example, the brake pedal sensor 70 may detect the position of a brake pedal or the position or operating state of a component that may be connected to or operated by a brake pedal, such as a treadle valve that may modulate a control fluid pressure that may be provided to a relay valve that may control the supply of fluid to one or more brake actuators. The detected position of the brake pedal may be used to control the brake torque provided by the brake system 40. For example, depending on the configuration of the brake system 40 the controller 60 may control operation of a valve that controls fluid pressure provided to a friction brake 42, a brake pump that pressurizes fluid, or an electric motor that actuates a brake pad assembly and/or the secondary brake torque that is provided by the secondary brake 44. Fluid pressure output or electric motor actuation may be proportional to a detected angle of motion or degree of actuation of the brake pedal or other brake command input device.

The wheel speed sensor 72 may be provided to detect or provide data indicative of a rotational speed of a wheel assembly 14 or wheel 28. The wheel speed sensor 72 may be of any suitable type and may be configured to detect the rotation speed of a wheel assembly 14 or associated wheel axle 34. Data from the wheel speed sensor 72 may also be used to determine a distance of travel of the vehicle 10. For instance, distance of travel may be based on tire size (e.g., tire diameter) and the rotational distance or number of revolutions detected by the wheel speed sensor 72. In at least one embodiment, a wheel speed sensor 72 may be associated with each wheel assembly 14 or wheel axle 34, such as may be provided with an anti-lock brake (ABS) system or traction control system. As such, the wheel speed sensor 72 may detect wheel slip or unexpected rotation of a wheel assembly 14 in a manner known by those skilled in the art. Communication between the controller 60 and each wheel speed sensor 72 is represented by connection nodes W1 through W6 in FIG. 1.

A vehicle speed sensor 74 may also be provided to detect or provide data indicative of a speed of the vehicle 10. The vehicle speed sensor 74 may be separate from the wheel speed sensor 72 and may be provided with a drivetrain component, such as the transmission 22 or transaxle, driveshaft 30, or an axle assembly shaft to detect vehicle speed based on the rotation speed of a drivetrain component.

Figure 3:
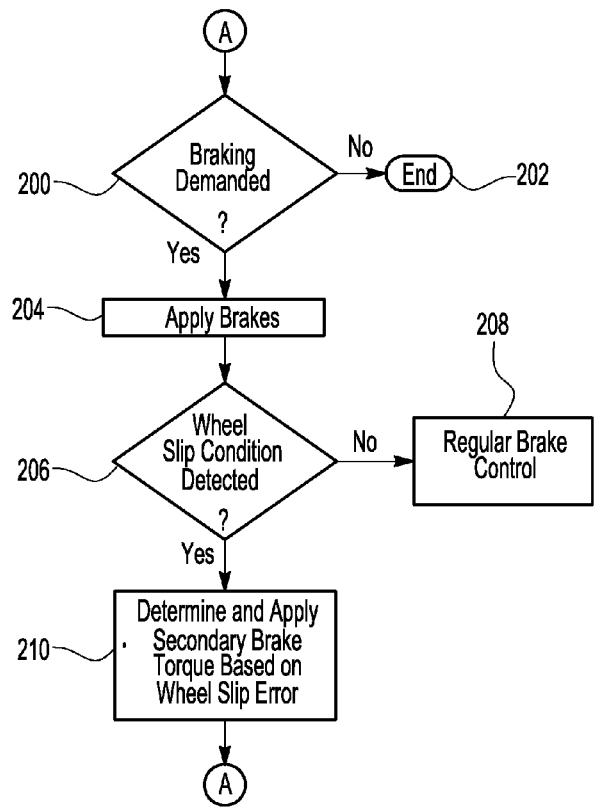
FIG. 3 is another flowchart of a method of controlling a brake system.

Referring to FIGS. 2 and 3, flowcharts of exemplary methods of controlling a vehicle brake system 40 are shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention.

In at least one embodiment, a method may be executed by the controller 60 and may be implemented as a closed loop control system. Moreover, the method may be enabled or disabled based the operating state of the vehicle 10 and/or which drivetrain gear ratio is selected. For example, the method may be disabled if a reverse gear ratio is selected or the vehicle 10 not running or a "key-on" condition is not present, which may be based on data from an ignition sensor.

Referring to FIG. 2, a first embodiment of a method of controlling a brake system is shown. This embodiment may be configured as an open loop control system.

At block 100, the method may determine whether braking is demanded or requested. A demand for braking may be based on data or a signal from the brake pedal sensor 70. If braking is not demanded, then the method or method iteration may end at block 102. If braking is demanded, then the method may continue at block 104.

At block 104, a brake may be applied to slow the vehicle 10. For example, one or more friction brakes 42 may be applied without the secondary brake 44. Alternatively, the friction brake torque from one or more friction brakes 42 may be blended with the secondary brake torque from the secondary brake 44 with the brake blending control unit 48.

At block 106, the method may determine whether a wheel slip condition is detected. Wheel slip may be indicative of relative motion between a tire 26 and the road surface or surface under the vehicle 10 upon which the tire 26 is moving. A wheel slip condition may be detected while braking the vehicle 10 and may be present when there is no wheel slip or the detected or estimated wheel slip is less than a threshold amount. Wheel slip may be expressed as a wheel slip ratio that may be representative of a ratio of the rotational speed of a braked wheel to that of an equivalent free rolling wheel. Wheel slip ratio may be expressed as a percentage and may be calculated using the following formula.

Wheel slip ratio %=(Vehicle speed−wheel speed)/Vehicle speed*100

Wheel speed may be based on data from a wheel speed sensor 72. Vehicle speed may be based on data from the vehicle speed sensor 74.

Wheel slip or the wheel slip ratio may be compared to a slip reference value to determine whether the amount of wheel slip is expected or acceptable. The slip reference value may be a predetermined constant or static value that may be expressed as a percentage of the wheel slip ratio, such as 15% to 20%. The difference between the wheel slip ratio and the slip reference value may be called a wheel slip error. If the wheel slip or wheel slip ratio does not exceed the slip reference value, then the amount of wheel slip may be expected or acceptable and a wheel slip condition of sufficient magnitude may not be present in which case the method may continue at block 108. If the wheel slip or wheel slip ratio exceeds the slip reference value, then the amount of wheel slip may be unexpected or unacceptable and a wheel slip condition of sufficient magnitude may be present, in which case the method may continue at block 110.

At block 108, normal or regular brake control may be executed in which the friction brake 42 and secondary brake 44 may be applied in proportion to the amount of braking demanded by a driver or driver brake command detected by the brake pedal sensor 70. Moreover, a control pulse generator that may be provided with or controlled by the controller 60 may be deactivated such that the secondary brake 44 is not pulsed or cycled at a constant rate as will be discussed in more detail below.

At block 110, a control pulse generator may be activated to control the secondary brake 44. The control pulse generator may be part of the controller 60 or may be controlled by the controller 60 and may generate a constant frequency control pulse. The constant frequency control pulse may be used to actuate the secondary brake 44 between an actuated position or a braking position in which the secondary brake 44 exerts a secondary brake torque and a retracted or non-braking position in which the secondary brake 44 does not exert a secondary brake torque. The constant frequency control pulse may be a high-frequency signal of about 10 Hz. As such, the constant frequency control pulse may pulse or cycle the secondary brake 44 at a constant rate to reduce the likelihood of wheel lockup.

At block 112, the method may determine whether a wheel slip condition is still detected or still present. If a wheel slip condition is still detected, then the method may return to block 110 and continue generating the constant frequency control pulse to cycle or pulse the secondary brake 44 at a constant rate. If a wheel slip condition is no longer detected, then the method may continue at block 108 where the constant frequency control pulse may be terminated and regular brake control may be executed.

Referring to FIG. 3, another embodiment of a method of controlling a brake system is shown. This embodiment may be configured as a closed loop control system. In addition, this method may dynamically control the secondary brake rather than by providing a constant frequency control pulse to cycle the secondary brake at a constant rate.

At block 200, the method may determine whether braking is demanded or requested. An assessment of brake demand may be conducted in a similar manner as discussed above with reference to block 100. If braking is not demanded, then the method or method iteration may end at block 202. If braking is demanded, then the method may continue at block 204.

At block 204, the brakes may be applied. The brakes may be applied in a similar manner as discussed above with reference to block 104.

At block 206, the method may determine whether a wheel slip condition is detected. Detection of a wheel slip condition may be accomplished in a similar manner as discussed above with reference to block 106. If a wheel slip condition is not detected, then the method may continue at block 208. If a wheel slip condition is detected, then the method may continue at block 210.

At block 208, normal or regular brake control may be executed in which the friction brake 42 and secondary brake 44 may be applied in proportion to the amount of braking requested or the brake command detected by the brake pedal sensor 70.

At block 210, a secondary brake torque may be determined and applied. More specifically, the secondary brake torque provided by the secondary brake 44 may be based on the wheel slip error. The wheel slip error may be the difference between the wheel slip ratio and the slip reference value as previously discussed. The wheel slip error may change over time due to changes in a wheel rotational speed and factors that may change the amount of friction between the tire 26 and the road surface. As such, block 210 may determine and apply a secondary brake torque that is based on or proportional to the wheel slip error. More specifically, the controller 60 may calculate or determine a desired secondary brake torque to apply and generate a signal to command the secondary brake 44 to apply the desired secondary brake torque. For example, a lookup table may be provided that may have desired secondary brake torque values that are associated with different wheel slip error values. Accordingly, a desired secondary brake torque value and associated command signal may be determined based on wheel slip error by direct lookup or by interpolation.

The method may continue as a loop by returning to block 200, as indicated by connector circle A in FIG. 3. As such, the method may continue to determine whether a wheel slip condition is detected so long as braking is demanded and may adjust the secondary brake torque in response to changes in the wheel slip error if warranted during one or more subsequent iterations. Thus, the secondary brake torque may change as the wheel slip error changes, which may allow the secondary brake to be effectively applied or pulsed at a variable rate when a wheel slip condition is detected. Moreover, the friction brake may be pulsed to provide antilock brake functionality independently of or in addition to the secondary brake.

The system and method described herein may allow a friction brake and a secondary brake to be applied simultaneously to provide additional braking power as compared to providing a friction brake torque or a secondary brake torque alone. Moreover, the system and method may allow the friction brake torque and secondary brake torque to be applied in a manner that may inhibit wheel slip or that may not cause wheel slip. For example, the secondary brake torque may be provided in a manner that does not cause wheel slip by pulsing the secondary brake and/or by providing secondary brake torque at a magnitude that does not cause undesired wheel slip. The secondary braking torque may then be supplemented by the friction braking torque to provide additional braking performance or antilock braking functionality to enhance vehicle control while also reducing wear or loading of the friction brake that may otherwise reduce friction brake life. Moreover, the decision to engage or disengage a secondary brake may be controlled automatically rather than by driver input (e.g., by an operator manually applying or failing to apply a secondary brake). As such, the system and method may apply secondary braking to increase brake torque and improve braking performance as compared with friction braking alone while avoiding the application of excess secondary braking that may result from manual secondary brake control and that may cause wheel slip such as during slippery driving conditions. The system and method may also allow a secondary brake to be applied in wet or slippery conditions, which may differ from secondary brake systems like driveline retarders in which secondary braking is automatically disengaged to avoid applying additional braking torque to a vehicle wheel when antilock braking of a friction brake is activated.

The exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a vehicle brake system comprising:
    applying a friction brake to slow rotation of a vehicle wheel; and
    pulsing a secondary brake that provides a secondary brake torque that slows rotation of the vehicle wheel by decreasing torque that is provided to the vehicle wheel to rotate the vehicle wheel when a wheel slip condition is detected.

2. The method of claim 1 wherein the secondary brake is pulsed at a constant rate when the wheel slip condition is detected.

3. The method of claim 2 wherein pulsing of the secondary brake at the constant rate is terminated when the wheel slip condition is no longer detected.

4. The method of claim 2 wherein pulsing of the secondary brake occurs in response to a constant frequency control pulse that is generated by a controller.

5. The method of claim 2 wherein the secondary brake is not pulsed at the constant rate when the wheel slip condition is not detected.

6. The method of claim 2 wherein the secondary brake is not pulsed at the constant rate when the friction brake is not applied.

7. The method of claim 1 wherein the secondary brake is applied in proportion to a driver brake command when the wheel slip condition is not detected.

8. A method of controlling a vehicle brake system comprising:
    applying a friction brake torque with a friction brake to slow rotation of a vehicle wheel;
    determining whether a wheel slip condition is present; and
    applying a secondary brake torque with a secondary brake in proportion to a wheel slip error when a wheel slip condition is present, wherein the secondary brake torque slows rotation of the vehicle wheel by decreasing torque that is provided to the vehicle wheel to rotate the vehicle wheel.

9. The method of claim 8 wherein the wheel slip condition is present when a wheel slip ratio of the vehicle wheel exceeds a slip reference value.

10. The method of claim 9 wherein the wheel slip ratio is based on a wheel speed and a vehicle speed.

11. The method of claim 9 wherein the slip reference value is a constant.

12. The method of claim 9 wherein the wheel slip error is based on a difference between wheel slip ratio and the slip reference value.

13. The method of claim 8 wherein the wheel slip condition is detected while braking the vehicle.

14. The method of claim 8 wherein the secondary brake is pulsed at a variable rate when the wheel slip condition is detected.

15. A vehicle brake system comprising:
- a friction brake that is disposed proximate a vehicle wheel and that is configured to provide a friction brake torque to slow rotation the vehicle wheel;
- a secondary brake that is configured to provide a secondary brake torque that slows rotation of the vehicle wheel by decreasing torque that is provided to the vehicle wheel to rotate the vehicle wheel; and
- a controller that controls the friction brake and the secondary brake such that the friction brake torque and the secondary brake torque are applied when a wheel slip condition is detected.

16. The system of claim 15 wherein the secondary brake is activated and deactivated by the controller at a constant rate when the wheel slip condition is detected to provide the secondary brake torque.

17. The system of claim 15 wherein the secondary brake torque is based on a wheel slip error that is based on data from a vehicle speed sensor and a wheel speed sensor and a predetermined slip reference value.

18. The system of claim 15 wherein the friction brake torque and the secondary brake torque are provided by pulsing at least one of the friction brake and the secondary brake, respectively, when the wheel slip condition is detected.

19. The system of claim 15 wherein the secondary brake torque is provided by a driveline retarder.

20. The system of claim 15 wherein the friction brake is configured as a drum brake or a disc brake.

* * * * *

UNITED STATES PATENT AND TRADEMARK OFFICE
CERTIFICATE OF CORRECTION

| | | |
|---|---|---|
| PATENT NO. | : 9,193,339 B2 | Page 1 of 1 |
| APPLICATION NO. | : 14/087046 | |
| DATED | : November 24, 2015 | |
| INVENTOR(S) | : Yixin Yao et al. | |

It is certified that error appears in the above-identified patent and that said Letters Patent is hereby corrected as shown below:

Claims

Column 9, Line 4, Claim 15:

After "to slow rotation"
Insert -- of --.

Signed and Sealed this
First Day of March, 2016

Michelle K. Lee
*Director of the United States Patent and Trademark Office*